United States Patent [19]
Kajimoto et al.

[11] 4,420,408
[45] Dec. 13, 1983

[54] MAGNETIC RECORDING MEDIUM

[75] Inventors: Norifumi Kajimoto; Kinji Sasaki, both of Tokyo, Japan

[73] Assignee: TDK Electronics Co., Ltd., Tokyo, Japan

[21] Appl. No.: 265,676

[22] Filed: May 20, 1981

[30] Foreign Application Priority Data

Jun. 13, 1980 [JP] Japan .................................. 55-78925

[51] Int. Cl.³ .......................... H01F 1/00; G11B 5/70
[52] U.S. Cl. .................................. 256/62.54; 428/329
[58] Field of Search .......................... 252/62.53, 62.54; 428/329

[56] References Cited

U.S. PATENT DOCUMENTS

| | | | |
|---|---|---|---|
| 3,687,725 | 8/1972 | Hartmann et al. | 428/325 |
| 4,015,042 | 3/1977 | Chassaigne | 428/325 |
| 4,172,176 | 10/1979 | Tanaka et al. | 428/411 |
| 4,275,115 | 6/1981 | Narlise | 428/329 |

Primary Examiner—F. Edmundson
Attorney, Agent, or Firm—Oblon, Fisher, Spivak, McClelland & Maier

[57] ABSTRACT

A magnetic recording medium comprises a combination of two or more kinds of fine abrasive powders having different true specific gravities in a magnetic layer containing a magnetic powder.

5 Claims, 4 Drawing Figures

MAGNETIC RECORDING MEDIUM

BACKGROUND OF THE INVENTION

1. Field of the Invention

The present invention relates to a magnetic recording medium. More particularly, it relates to a magnetic recording medium having an improved still characteristic.

2. Description of the Prior Arts

One of the important characteristics required for the magnetic recording media is still characteristic. In the recording and reproducing a video tape recorder, it is necessary to prevent wearing of the surface of a magnetic recording tape by a head in order to improve a still reproduction.

Ine one system, during the still reproduction, two magnetic heads are brought into contact with a magnetic recording tape wound in arch on a rotary drum with a gap of 180 degrees near rotary head and the magnetic heads are rotated at high speed. When the wearing resistance of the magnetic recording tape is not high enough, the surface of the tape is gradually damaged to shorten a still reproducing time.

Heretofore, fine hard abrasive powder which is harder than that of the magnetic powder has been incorporated in the magnetic layer of the magnetic recording tape in order to improve the still characteristic.

Recently, a narrow track head has been used for high recording density whereby the RF (high frequency) output reproducing time in the still reproduction has been shortened. FIG. 1 shows this condition, the relations of decreases of RF reproducing output and times are shown and the curve A shows the relation in the use of a reproducing head having a width of 100 μm and the curve B shows the relation in the use of a reproducing head having a width of 60 μm. In such magnetic recording media, the improvement of the still characteristic resulted by the improvement of the wearing resistance of the tape is required.

SUMMARY OF THE INVENTION

It is an object of the present invention to provide a magnetic recording medium having an improved still characteristic.

The foregoing and other objects of the present invention have been attained by providing a magnetic recording medium comprising a combination of two or more kinds of fine abrasive powders having different true specific gravities in a magnetic layer containing a magnetic powder.

DETAILED DESCRIPTION OF THE PREFERRED EMBODIMENTS

Various fine abrasive powders have been studied to incorporate in the magnetic layer of the magnetic recording medium. As a result, it has been found to improve the still characteristic by a combination of two kinds of fine abrasive powders having different true specific gravities in comparison with that of single abrasion powder. The optimum combination is the combination of a fine abrasive powder having true specific gravity similar to that of the magnetic powder and high hardness and another fine abrasive having lower true specific gravity than that of the former and high hardness.

The incorporation of the two kinds of the fine abrasive powders having different true specific gravities into the magnetic layer is usually carried out by mixing the magnetic powder with a binder and then, adding the mixture of the fine abrasive powders and if necessary adding a desired curing agent and a desired additive to prepare a magnetic paint and coating it on a substrate by the conventional method. It is also possible to blend the abrasive powders to the magnetic powder at the beginning.

It is enough to combine two kinds of fine abrasive powders as alumina and chromium oxide. It is also possible to combine three kinds of fine abrasive powders. It is preferable to use alumina and chromium oxide as two kinds of the powders.

The following abrasive powders have been studied in the present invention.

TABLE

| | True specific gravity | Hardness (Moh's Scale) |
|---|---|---|
| Alumina ($Al_2O_3$) | 3.9 | 9 |
| Chromium oxide ($Cr_2O_3$) | 5.2 | 8 |
| Zirconium oxide ($ZrO_2$) | 5.2 | 8 |
| Silicon carbide (SiC) | 3.2 | 9 |
| Silicon oxide ($SiO_2$) | 2.7 | 7 |
| Titanium oxide ($TiO_2$) | 4.2 | 7 |
| Iron oxide ($\alpha$-$Fe_2O_3$) | 5.2 | 6 |
| Cerium oxide ($CeO_2$) | 6.5 | 7 |

Various experiments were carried out by using these abrasive powders. As results of various experiments, it has been found that the still characteristic is improved by using at least two kinds of abrasive powders having highly different true specific gravities. Among the combinations of the above-mentioned abrasive powders, the combination of alumina and chromium oxide imparts special synergism whereas the combination of silicon carbide and alumina or the combination of chromium oxide and zirconium oxide are inferior to the former combination.

Figure 1:
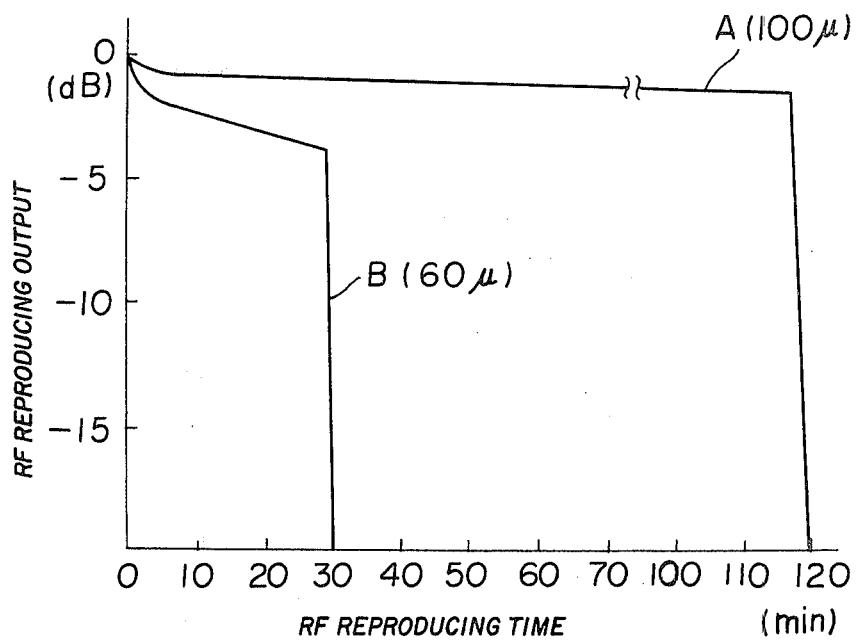
FIG. 1 shows relations of RF reproducing output and RF output reproducing time.
Figure 2:
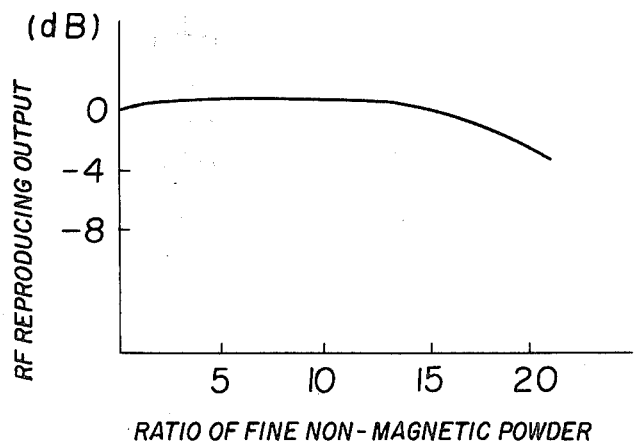
FIG. 2 shows a relation of RF reproducing output (dB) and a ratio of a fine non-magnetic powder based to a magnetic powder.

The fine abrasive powders are non-magnetic powders and accordingly, the electromagnetic characteristics may be inferior if the content of the mixture of the fine abrasive powders is large. FIG. 2 shows the relation of RF reproducing output and a ratio of a total content of the non-magnetic powders to the magnetic powder. As it is clearly found from the graph of FIG. 2, it is preferable to give a ratio of the non-magnetic powders to the magnetic powder of upto 20 wt.%.

When a mixture of $Al_2O_3$ and $Cr_2O_3$ is used, the ratio of $Al_2O_3$ to $Cr_2O_3$ is preferably about 1. The ratio of the two kinds of the fine abrasive powders having different true specific gravities is usually in a range of 2:8 to 8:2 especially 0.5:1.5 to 1.5:0.5. The tendency is the same as that of the combination of $Al_2O_3$ and $Cr_2O_3$.

The ratio of two kinds of the fine abrasive powders should be considered in balance in view of both characteristics of the still reproducing time and the head wearing degree since these characteristics are depending upon the combinations as described in Examples. The total content of the mixture of the fine abrasive powders should be also considered and is preferably in a range of 0.5 to 15 wt.% based on the magnetic powder.

When a diameter of the fine abrasive powders is larger, the still characteristic is improved, whereas the wearing of the magnetic head is increased, in most of the powders. The diameter of the fine abrasive powders is preferably in a range of 0.1 to 3.0 μm.

The present invention will be further illustrated by certain examples and references which are provided for purposes of illustration only and are not intended to be limiting the present invention.

EXAMPLE 1

A composition containing a magnetic powder having the following components was prepared.

| | |
|---|---|
| Co—adsorbed iron oxide magnetic powder: | 400 g. |
| Nitrocellulose: | 30 g. |
| Vinyl chloride resin: | 15 g. |
| Urethane elastomer: | 40 g. |
| Carbon: | 20 g. |

Alumina powder (particle diameter of 1.0μ) and chromium oxide powder (particle diameter of 0.5μ) at various ratios were mixed with the above-mentioned composition to prepare each magnetic paint and an isocyanate curing agent was added and each mixture was coated on a polyethyleneterephthalate film at a thickness of about 5 μm to prepare a magnetic recording tape.

Figure 3:
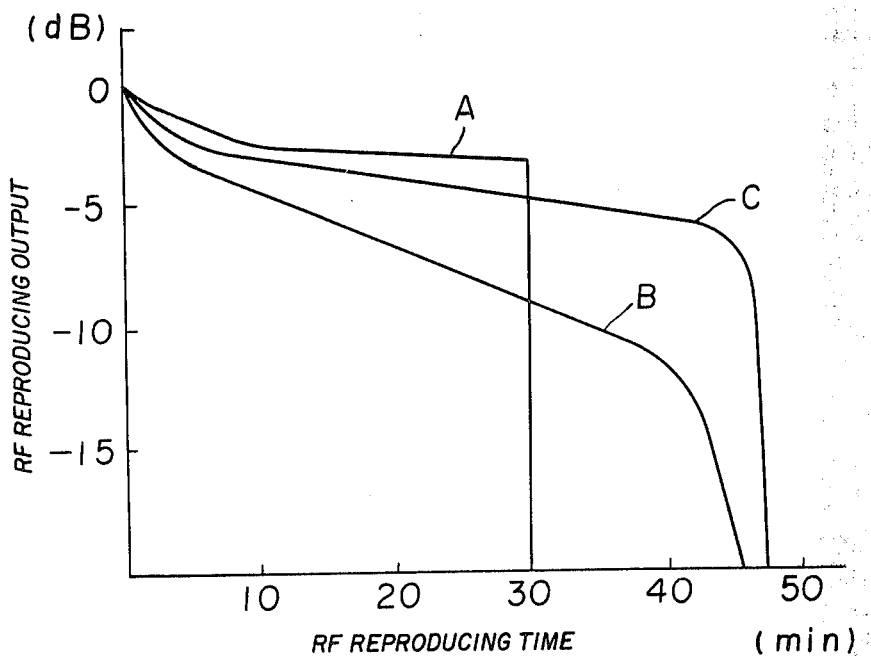
FIG. 3 shows relations of RF reproducing output and RF output reproducing time in the case of the use of alumina and chromium oxide.
Figure 4:
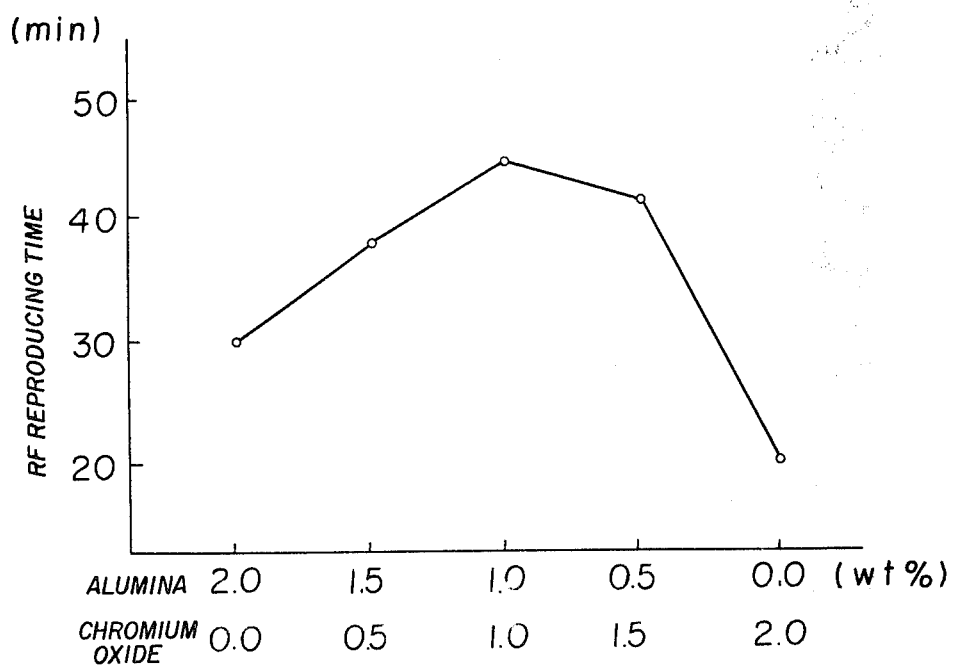
FIG. 4 shows a relation of RF reproducing output time (min.) and ratios of alumina to chromium oxide.

Each still characteristic of each magnetic recording tape was measured by VTR at 20° C. in relative humidity of 60% to obtain the results shown in FIGS. 3 and 4.

FIG. 3, line A shows the relation of the still reproducing time of the RF reproducing output in the case of the use of only alumina powder. FIG. 3, line B shows the same relation in the case of the use of only chromium oxide powder. FIG. 3, line C shows the same relation in the case of the use of alumina powder and chromium oxide powder at a ratio of 1:1 by weight. In these tests, a content of the alumina powder and chromium oxide powder was at a ratio of 2 wt.%.

As it is clear from FIG. 3, line A, B and C, the reduction of the initial reproducing output level is only slight but the reproducing output level is suddenly reduced from certain point and accordingly, the still reproducing time is short in the case of only alumina powder.

The reduction of the reproducing output level is remarkable in the case of the use of only chromium oxide.

The line C of FIG. 3 shows the results of the present invention. The reduction of reproducing output level is small and the still reproducing time is long.

FIG. 4 is a graph of RF reproducing output time in variation of the ratio of alumina powder to chromium oxide powder (a content of the abrasives is 2 wt.% based on the magnetic powder). In the case, the RF reproducing output time means the time from the start of the still reproduction to the reduction of the RF reproducing output for 6 dB. As it is clearly found in FIG. 4, the still characteristic of the resulting magnetic recording tape using both of the powders is remarkably superior to those of the use of only alumina powder or chromium oxide powder.

EXAMPLE 2

In accordance with the process of Example 1 except using the other powders such as silicon carbide, zirconium oxide, silicon oxide, cerium oxide, titanium oxide and iron oxide as the abrasive powder, each test was carried out for the effect of the abrasive powder and the combinations thereof.

Certain differences for absolute values were found and similar effects to those of FIGS. 3 and 4 were found in most of the combinations in the case of the use of the abrasive powders having a large difference of true specific gravities of the powders.

The results of the typical combinations are shown in Table 1. (Data for the addition of the abrasive powders (1:1) at a ratio of 2 wt.% based on the magnetic powder.) As it is found in Table 1, the combination of alumina-chromium oxide is the optimum.

TABLE 1

| Combination of abrasive powders (1:1) | Still reproducing time (min.) |
|---|---|
| alumina/chromium oxide | 45 |
| silicon oxide/alumina | 35 |
| alumina/zirconium oxide | 37 |
| silicon carbide/chromium oxide | 40 |
| silicon oxide/chromium oxide | 30 |
| titanium oxide/chromium oxide | 25 |
| chromium oxide/cerium oxide | 29 |
| *silicon carbide/alumina | 31 |
| *chromium oxide/zirconium oxide | 17 |

Note: A combination of powders having a small difference of true specific gravities.

EXAMPLE 3

In accordance with the process of Example 1 except using polyethyleneterephthalate resin at the same ratio instead of vinyl chloride resin in the magnetic paint, magnetic recording tapes were prepared. The still reproducing times of the products were the same as those of FIGS. 3 and 4.

In accordance with the process of Example 1 except eliminating nitrocellulose in the magnetic paint, magnetic recording tapes were prepared. The results were the same as those of Example 1.

In accordance with the process of Example 1 except eliminating the isocyanate curing agent to provide a plastic binder, magnetic recording tapes were prepared. The still characteristics were inferior however, the results were similar to those of FIGS. 3 and 4 as the tendency.

Various modifications of the uses of the known thermoplastic resins, the known thermosettable resins and the known reactive resins and the combinations thereof which are different from those of Examples 1 and 2 as the binder were tested. The still characteristics were slightly different but the results were similar to those of FIGS. 3 and 4 as the tendency.

EXAMPLE 4

In accordance with the process of Example 1 except using α-Fe$_2$O$_3$ powder, Fe$_3$O$_4$ powder, Co-adsorbed Fe$_3$O$_4$ powder or magnetic alloy or a mixture thereof instead of Co-adsorbed iron oxide magnetic powder, each magnetic recording tape was prepared and characteristics thereof were tested. The results were similar to those of FIGS. 3 and 4.

I claim:

1. A magnetic recording medium which comprises an admixture consisting of at least two fine abrasive powders having different true specific gravities differing by more than 1.0, each of said powders being of a Moh's hardness of at least 7, in a magnetic layer containing a magnetic powder, the ratio of the two fine abrasive powders being in the range of 2:8 to 8:2.

2. The magnetic recording medium according to claim 1 wherein said abrasive powders are incorporated at a ratio of up to 20 wt.% based on said magnetic powder.

3. The magnetic recording medium according to claim 1 wherein said fine abrasive powders are alumina and chromium oxide having different true specific gravities.

4. The magnetic recording medium according to claim 1 wherein said abrasive powders and true specific gravities are selected from the group consisting of $Al_2O_3$ (3.9), $Cr_2O_3$ (5.2), $ZrO_2$ (5.7), SiC (3.2), $SiO_2$ (2.7), and $TiO_2$ (4.2).

5. The magnetic recording medium according to claim 1 wherein the magnetic power is Co-adsorbed iron oxide magnetic powder.

* * * * *